United States Patent
Shair et al.

(10) Patent No.: US 10,583,617 B2
(45) Date of Patent: Mar. 10, 2020

(54) AUTOMATIC SYSTEMS AND METHODS FOR STACKING COMPOSITE PLIES

(71) Applicant: General Electric Company, Schenectady, NY (US)

(72) Inventors: Sultan Shair, Bavaria (DE); Andreas Lutz, Bavaria (DE); Martin Petersen, Bavaria (DE); Matthew Hall Beaumont, Bavaria (DE); Mathias Ernst Messmer, Bavaria (DE); Stefaan Guido Van Nieuwenhove, Bavaria (DE); Thomas Kluge, Bavaria (DE); Christopher James Madsen, Layton, UT (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 15/361,529

(22) Filed: Nov. 28, 2016

(65) Prior Publication Data

US 2018/0147795 A1  May 31, 2018

(51) Int. Cl.
  *B29C 70/38* (2006.01)
  *B29C 70/30* (2006.01)
  *B32B 38/04* (2006.01)

(52) U.S. Cl.
  CPC .............. *B29C 70/38* (2013.01); *B29C 70/30* (2013.01); *B32B 2038/042* (2013.01);
  (Continued)

(58) Field of Classification Search
  CPC ... B32B 2038/042; B29C 70/30; B29C 70/38; B29C 70/382; B29C 70/384;
  (Continued)

(56) References Cited

U.S. PATENT DOCUMENTS

| 3,621,092 A | 11/1971 | Hofer |
| 4,622,192 A | 11/1986 | Ma |

(Continued)

FOREIGN PATENT DOCUMENTS

| CA | 928924 A | 6/1973 |
| CA | 1013527 A | 7/1977 |

(Continued)

OTHER PUBLICATIONS

International Search Report and Written Opinion issued in connection with corresponding PCT Application No. PCT/US2017/058193 dated Jan. 23, 2018.

(Continued)

*Primary Examiner* — Carson Gross
(74) *Attorney, Agent, or Firm* — Dority & Manning, P.A.

(57) ABSTRACT

A method and an automatic layup system for making a stack of a plurality of composite plies are presented. The automatic layup system includes a stacking assembly located in a first plane and a layup tool located in a second plane parallel to the first plane. The stacking assembly and the layup tool are movable towards each other. The method includes the steps of (a) providing one or more composite sheets between the layup tool and the stacking assembly, (b) generating a first composite ply from the one or more composite sheets, (c) placing the first composite ply on the layup tool by the stacking assembly by bringing the stacking assembly and the layup tool close to each other, and (d) repeating the steps (b) and (c) for generating and placing a second composite ply on the first composite ply, which is placed on the layup tool.

11 Claims, 7 Drawing Sheets

(52) U.S. Cl.
CPC ...... *Y10T 156/107* (2015.01); *Y10T 156/1052* (2015.01); *Y10T 156/1075* (2015.01)

(58) Field of Classification Search
CPC ................ B29C 70/386; B29C 70/388; Y10T 156/1052; Y10T 156/1062; Y10T 156/107; Y10T 156/1075; Y10T 156/1077; B65H 2404/281; B65H 2301/44; B65H 2301/4432; B65H 2301/44322; B65H 20/00; B65H 23/00
USPC ....................................................... 156/261
See application file for complete search history.

(56) References Cited

U.S. PATENT DOCUMENTS

| | | | |
|---|---|---|---|
| 5,049,323 A | 9/1991 | Giles, Jr. | |
| 5,200,133 A | 4/1993 | Dieul et al. | |
| 5,247,825 A | 9/1993 | Erickson | |
| 5,260,017 A | 11/1993 | Giles, Jr. | |
| 5,468,437 A | 11/1995 | Hall | |
| 5,540,126 A * | 7/1996 | Piramoon | B04B 7/085 83/34 |
| 5,585,432 A | 12/1996 | Lee et al. | |
| 5,681,887 A | 10/1997 | Ikeda et al. | |
| 5,766,405 A | 6/1998 | Herklotz et al. | |
| 6,270,600 B1 | 8/2001 | Wycech | |
| 6,343,639 B1 | 2/2002 | Kaye et al. | |
| 6,979,377 B2 | 12/2005 | Buenis et al. | |
| 7,429,172 B2 | 9/2008 | Chotard | |
| 8,191,215 B2 | 6/2012 | Meyer | |
| 8,491,829 B2 | 7/2013 | Le Hetet | |
| 8,557,165 B2 | 10/2013 | Jones et al. | |
| 8,567,469 B2 | 10/2013 | Meyer et al. | |
| 8,568,549 B2 | 10/2013 | Meyer et al. | |
| 8,826,957 B2 | 9/2014 | Shair et al. | |
| 8,997,642 B2 | 4/2015 | Stewart et al. | |
| 2014/0183784 A1 | 7/2014 | Bartel et al. | |
| 2014/0238617 A1 | 8/2014 | Shair et al. | |
| 2014/0363585 A1 | 12/2014 | Pialot et al. | |
| 2015/0099091 A1 | 4/2015 | Kurtz et al. | |
| 2017/0341278 A1 | 11/2017 | Shair et al. | |

FOREIGN PATENT DOCUMENTS

| | | |
|---|---|---|
| CA | 1 137 724 A | 12/1982 |
| CN | 102430642 A | 5/2012 |
| CN | 103930256 A | 7/2014 |
| DE | 2365895 A1 | 5/1977 |
| DE | 19924005 A1 | 11/2000 |
| DE | 102010061991 A1 | 5/2012 |
| EP | 2743062 A1 | 6/2014 |
| FR | 2238585 A1 | 2/1975 |
| FR | 2567807 A1 | 1/1986 |
| FR | 2981001 B1 | 11/2013 |
| JP | 51044166 A | 4/1976 |
| JP | 53074175 A | 7/1978 |
| JP | 55164127 A | 12/1980 |
| JP | 565734 A | 1/1981 |
| JP | 57029490 A | 2/1982 |
| JP | 57047619 A | 3/1982 |
| JP | 57082013 A | 5/1982 |
| JP | 57120409 A | 7/1982 |
| JP | 58116130 A | 7/1983 |
| JP | 61040122 A | 2/1986 |
| JP | 61248724 A | 11/1986 |
| JP | 62056115 A | 3/1987 |
| JP | 62161522 A | 7/1987 |
| JP | 62179909 A | 8/1987 |
| JP | 63087228 A | 4/1988 |
| JP | 1235614 A | 9/1989 |
| JP | 2005176 B2 | 1/1990 |
| JP | 3027379 B2 | 4/1991 |
| JP | 5009301 A1 | 1/1993 |
| JP | 5024058 A | 2/1993 |
| JP | 6155495 A | 6/1994 |
| JP | 6155498 A | 6/1994 |
| JP | 6155499 A | 6/1994 |
| JP | 6234129 A | 8/1994 |
| JP | 6270177 A | 9/1994 |
| JP | 6344837 A | 12/1994 |
| JP | 8005057 B2 | 1/1996 |
| JP | 8027281 A1 | 1/1996 |
| JP | 8267626 A | 10/1996 |
| JP | 9300372 A | 11/1997 |
| JP | 10035542 A | 2/1998 |
| JP | 2948903 B2 | 9/1999 |
| JP | H11291274 A | 10/1999 |
| JP | 2976913 B2 | 11/1999 |
| JP | 3027379 B2 | 4/2000 |
| JP | 3053885 B2 | 6/2000 |
| JP | 2011-241450 A | 12/2011 |
| JP | 5462401 B1 | 4/2014 |
| JP | 2014069403 A | 4/2014 |
| JP | 2015131394 A | 7/2015 |
| KR | 10-1627683 B1 | 6/2016 |
| WO | 9915323 A1 | 4/1999 |
| WO | 2014/039378 A1 | 3/2014 |
| WO | 2014096639 A1 | 6/2014 |
| WO | 2015006440 A1 | 1/2015 |
| WO | 2015067572 A1 | 5/2015 |
| WO | 2015097301 A1 | 7/2015 |

OTHER PUBLICATIONS

Andreas et al., "Automated Removal of Prepreg Backing Paper—A Sticky Problem", SAE 2013 Aerotech Congress and Exhibition, Sep. 24-26, 2013, Conference Location: Montreal, Canada, 9 Pages.

* cited by examiner

AUTOMATIC SYSTEMS AND METHODS FOR STACKING COMPOSITE PLIES

BACKGROUND

The present disclosure relates generally to automatic layup systems and methods for forming a stack of composite plies, and more particularly to methods and systems for forming composite structures from the stacks of composite plies.

Methods of manufacturing composite structures (e.g., composite laminates) from composite plies generally utilize layering the composite plies on a tool (e.g., a mandrel). The tool may function as a mold to shape the composite structure to be produced. The composite plies may be positioned in various orientations depending on the type and fiber orientation of the composite materials and/or composite plies. Various systems may be used to layup the composite plies to form stacks of composite plies and to subsequently form composite structures. For example, automated tape laying machines have been employed for laying up composite plies on a mandrel. The stacked composite plies may be compressed against the mandrel to shape the stacked composite plies into a resulting composite structure. In this process, the composite plies that are cut from individual sheets of composite materials can be laid up by hand or an automated system such as automated tape laying machine or automated fiber placement machine. However, there are several issues in the currently available systems and methods. For example, these systems and methods are cumbersome because handling the composite plies is a labor intensive and repetitive process.

Therefore, there is a need for improved automated methods and systems for laying up composite plies to form a stack of composite plies, and subsequently to form a composite structure.

BRIEF DESCRIPTION

One aspect of the present disclosure is directed to a method for making a stack of a plurality of composite plies. The method includes the step (a) of providing one or more composite sheets between a layup tool and a stacking assembly of an automatic layup system. The automatic layup system includes the stacking assembly located in a first plane and the layup tool located in a second plane parallel to the first plane. The stacking assembly and the layup tool are movable towards each other. The method includes the step (b) of generating a first composite ply from the one or more composite sheets and the step (c) of placing the first composite ply on the layup tool by the stacking assembly by bringing the stacking assembly and the layup tool close to each other. The method further includes repeating the steps (b) and (c) for generating a second composite ply from the one or more composite sheets and placing the second composite ply on the first composite ply placed on the layup tool.

In another aspect, a method for making a stack of a plurality of composite plies includes the step (i) of providing one or more composite sheets between a layup tool and a plurality of stacking assemblies of an automatic layup system. The automatic layup system includes the plurality of stacking assemblies located in a first plane and the layup tool is movable in a second plane parallel to the first plane to a plurality of positions aligned with the plurality of stacking assemblies. The plurality of stacking assemblies and the layup tool are movable towards each other. The method includes the step (ii) of separating a first composite ply from the one or more composite sheets and placing the first composite ply on the layup tool by a first stacking assembly of the plurality of stacking assemblies by bringing the first stacking assembly and the layup tool close to each other when the layup tool is at a first position of the plurality of positions aligned with the first stacking assembly, the step (iii) of moving the layup tool with the first composite ply to a second position of the plurality of the positions aligned with a second stacking assembly of the plurality of stacking assemblies, and the step (iv) of separating a second composite ply from the one or more composite sheets and placing the second composite ply on the first composite ply placed on the layup tool. The second ply is placed by the second stacking assembly on the first composite ply by bringing the second stacking assembly and the layup tool with the first composite ply close to each other.

Another aspect of the present disclosure is directed to an automatic layup system. The automatic layup system includes at least one stacking assembly located in a first plane, at least one layup tool movable in a second plane parallel to the first plane to at least one position aligned with the at least one stacking assembly, and a support structure configured to hold a composite ply or a composite sheet between the at least one stacking assembly and the at least one layup tool. The at least one stacking assembly includes a positioning tool. The at least one stacking assembly and the at least one layup tool are movable towards each other.

BRIEF DESCRIPTION OF DRAWINGS

These and other features and aspects of embodiments of the present disclosure will become better understood when the following detailed description is read with reference to the accompanying drawings in which like characters in each individual figure represent like parts throughout the drawings, wherein.

DETAILED DESCRIPTION

Figure 1:
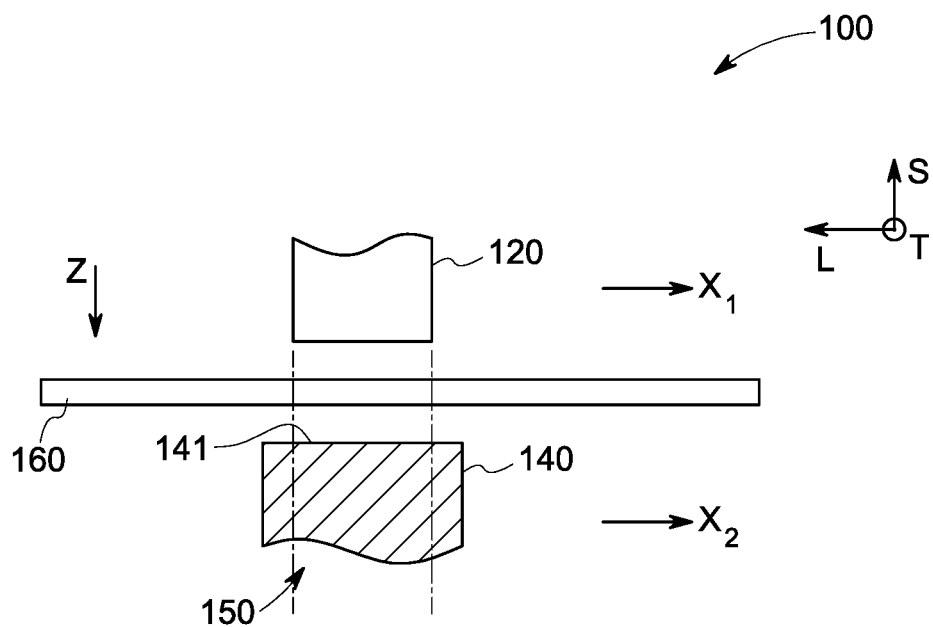
FIG. 1 is a schematic view of a portion of an automatic layup system for laying up a plurality of composite plies in accordance with one embodiment of the present disclosure.

The present disclosure is generally directed to methods and systems for laying up a plurality of composite plies such as polymeric plies and making a stack of such composite plies on a layup tool to subsequently form a composite structure, for example, a composite laminate. More specifically, some embodiments are directed to automatic layup systems for laying up a plurality of composite plies for making a stack of composite plies and automatic methods for making the stack of composite plies using such automatic layup systems. Such systems and methods avoid the cumbersome ways of handling the composite plies, for example, picking composite plies from one location and placing them in another location either manually or by using an automated machine. Further, the disclosed systems and methods allow forming complex stacks of different shapes, sizes, materials, and/or orientation (e.g., fiber orientation in each composite ply).

In the following specification and the claims, singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "composite sheet" refers to a sheet made of a composite material. The composite sheet may be in the form of a layer for example, a prepreg layer. The composite sheet may include a single layer of the composite material or multiple layers of the composite material. As used herein, the term "composite ply" refers to a ply made of a composite material. Suitable composite materials include, but not limited to, a polymeric material, glass, carbon, ceramic matrix composite, silicon carbide, alumina or combinations thereof. In some embodiments, the composite material includes a polymeric material. Suitable examples of the polymeric materials include, but not limited to, thermoplastics, polyimides, polyethylenes, epoxies, phenolic systems, or combinations thereof. The composite ply or the composite sheet may include the composite material in form of layers, fibers, foam, membranes, or combinations thereof. The composite ply or the composite sheet may further include additional materials and/or layers such as bagging materials, peel plies, release films, bleeders, breathers, bagging film, and other suitable materials and layers. A plurality of composite plies may be generated from a composite sheet by separating (e.g., cutting) pieces of desired shape and/or size from the composite sheet. As used herein, the term "one or more composite sheets" refers to one or more composite sheets individually made of different composite materials or different arrangement of composite materials (for example, fiber orientation).

Typically, a composite ply or a composite sheet is sandwiched between two backing layers or have a single backing layer. The backing layer(s) protects the composite ply or the composite sheet from environmental factors, such as moisture and contaminants. It also provides the desirable dimensional stability for the composite plies or the composite sheet that is essential for its handling manually or by using an automated machine. However, for making a stack of a plurality of composite plies, the backing layer of each composite ply needs to be removed manually or automatically in an additional step before placing one composite ply on top of another composite ply. The present methods and the systems allow the usage of composite plies or composite sheets without the need for a backing layer since the present methods and systems do not require manual handling of the composite plies. Further, picking and placing the composite plies or the composite sheets from one location to other location is also avoided. In some embodiments, the composite plies or the composite sheets that are provided to an automatic layup system as described herein, is free of a backing layer. In some embodiments, the backing layer(s) are removed from the composite plies or the composite sheets before providing the composite plies or the composite sheets to the automatic layup system for making a stack of a plurality of composite plies.

Some embodiments of the present disclosure are directed to automatic layup systems and methods for making stacks of a plurality of composite plies using the automatic layup systems. In some embodiments, an automatic layup system includes at least one stacking assembly located in a first plane and at least one layup tool movable in a second plane parallel to the first plane. The at least one layup tool is movable in the second plane to at least one position aligned with the at least one stacking assembly. The at least one stacking assembly includes a positioning tool. In some embodiments, the at least one stacking assembly is configured to place a composite ply to the at least one layup tool using, for example, the positioning tool. The at least one stacking assembly and the at least one layup tool are movable towards each other. The automatic layup system further includes a support structure configured to hold a composite ply or a composite sheet between the at least one stacking assembly and the at least one layup tool.

In some embodiments, an automatic layup system includes a plurality of stacking assemblies in the first plane. The automatic layup system may have the plurality of stacking assemblies arranged in a single row in a longitudinal direction of the automatic layup system or in multiple parallel rows in the longitudinal direction. In some embodiments, the plurality of stacking assemblies may be arranged in the first plane in any desired manner, for example, in a circular arrangement, a polygonal arrangement or a random manner. In these embodiments, the at least one layup tool is movable in the second plane from a first position aligned with a first stacking assembly to a second position aligned with a second stacking assembly of the plurality of stacking assemblies. In some embodiments, the automatic layup system includes a plurality of layup tools. The plurality of layup tools is movable in the second plane. Further, the plurality of stacking assemblies and the at least one layup tool are movable towards each other. For example, in some aspects, the plurality of stacking assemblies and the at least one layup tool are movable along a vertical axis i.e., in a perpendicular direction to the first and second planes.

The at least one layup tool may include a molding surface. The molding surface may have a flat surface or a complex surface. The complex surface may include a non-planar surface such as convex surfaces, concave surfaces, or combinations thereof. The complex surface may also include other geometric surfaces. For example, the complex surface may be a contoured surface. Other examples of the complex surfaces include flange surfaces, undercuts, or combination thereof. During the process of making the stack of the plurality of composite plies on the at least one layup tool, a composite ply is placed on the molding surface of the at least one layup tool. As used herein, the term "placing a composite ply on a layup tool" refers to placing a composite ply on a molding surface of the layup tool. As used herein, the term "a composite ply placed on a layup tool" refers to an already placed composite ply on a molding surface of the layup tool.

In some embodiments, the at least one layup tool is configured to rotate about a vertical axis. In some embodiments, the at least one layup tool is rotatable in the second plane about the vertical axis. A rotatable layup tool as described herein may help in placing a composite ply on the layup tool or on a previously placed composite ply on the layup tool in a desired manner, for example, in a desired fiber orientation.

As noted, the at least one stacking assembly includes a positioning tool. The positioning tool is configured to place a composite ply on the at least one layup tool. In some embodiments, the positioning tool is configured to compress (for example, compact or push) the composite ply during placing the composite ply on the at least one layup tool. In some embodiments, the positioning tool may be configured to separate a composite ply from the one or more composite sheets prior to or during placing the composite ply on the at least one layup tool. In some of these embodiments, the positioning tool includes a stamping tool. In some embodiments, the at least one stacking assembly further includes a separating tool that is configured to separate a composite ply from one or more composite sheets. In one embodiment, the separating tool is a cutting device. In some embodiments, the at least one stacking assembly further includes a forming tool that is configured to apply a compressive force on a composite ply after or during placing the composite ply on the at least one layup tool or on a previously placed composite ply on the at least one layup tool to adhere the composite ply or stacked composite plies on the at least one layup tool. In some embodiments, the at least one stacking assembly includes the positioning tool and the separating tool. In some embodiments, the at least one stacking assembly includes the positioning tool and the forming tool. In some embodiments, the at least one stacking assembly includes the positioning tool, the separating tool and the forming tool. In some embodiments, the at least one stacking assembly is configured to perform one or more of separating, placing, and forming steps. In some embodiments, the at least one stacking assembly further includes a heating element. One or more of the separating tool, the forming tool or the heating tool may be integrated with the positioning tool.

In some embodiments, the at least one stacking assembly and the at least one layup tool may be tilted relative to the corresponding first plane and the second plane at any desired angle such that the at least one stacking assembly can perform one or more of placing, separating, or forming a composite ply on the layup tool in a desired fashion.

The support structure may include a planar surface or a frame that holds or supports a composite ply or a composite sheet. In one embodiment, the planar surface has a flat surface. The planar surface may have one or more openings allowing the at least one stacking assembly or the at least one layup tool to move through the one or more openings towards each other. The support structure may include various means (e.g., clamps, grippers, or clips) for holding or supporting the composite ply or the composite sheet. In some embodiments, the composite ply or the composite sheet is held under tension. In some embodiments, the support structure may be configured to hold or support one or more composite sheets. In some embodiments, the composite sheet(s) is continuously supplied to the support structure. A composite ply or a composite sheet may be supplied to the support structure from any appropriate source, such as a supply roll or directly from a composite sheet manufacturing apparatus. A composite sheet may be supplied to the support structure in the form of a continuous web as produced from a typical production line.

FIG. 1 illustrates a non-limiting example of a configuration of an automatic layup system 100. The automatic layup system 100 includes a stacking assembly 120 located in a first plane '$X_1$' and a layup tool 140 located in a second plane '$X_2$' parallel to the first plane '$X_1$' when the automatic layup system 100 is at resting state. In some embodiments, the layup tool 140 is movable in the second plane '$X_2$' to at least one position 150 aligned with the stacking assembly 120. As illustrated, the layup tool 140 is located at a position 150 in the second plane '$X_2$' aligned with the stacking assembly 120. In some embodiments, the layup tool 140 is rotatable about a vertical axis 's' perpendicular to the first plane $X_1$ and the second plane '$X_2$.' The layup tool 140 has a molding surface 141. In operation, the stacking assembly 120 is movable along the vertical axis 's' in a direction indicated by 'z' towards the layup tool 140. In some embodiments, the layup tool 140 may be movable along the vertical axis 's' in a direction opposite to the direction 'z' towards the stacking assembly 120.

Figure 2:
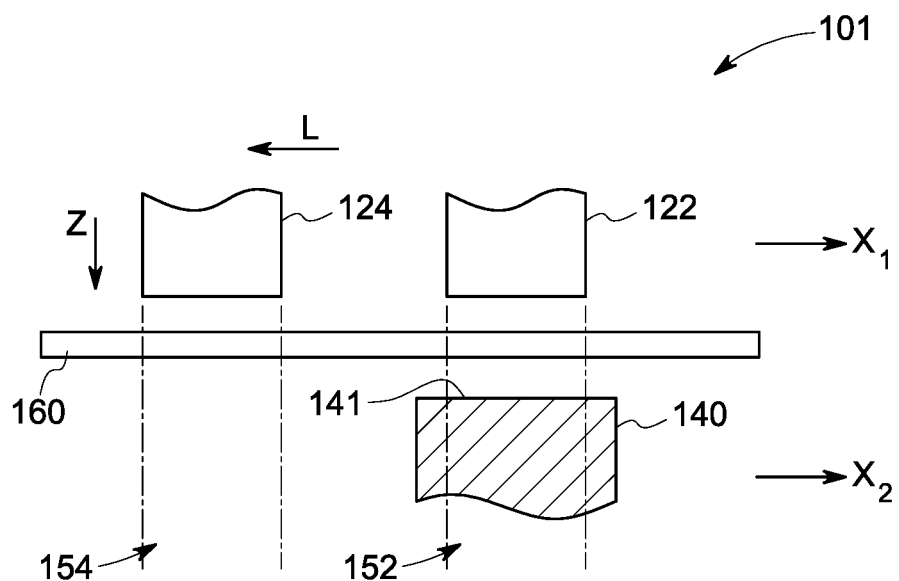
FIG. 2 is a schematic view of a portion an automatic layup system for laying up a plurality of composite plies in accordance with one embodiment of the present disclosure.
Figure 3:
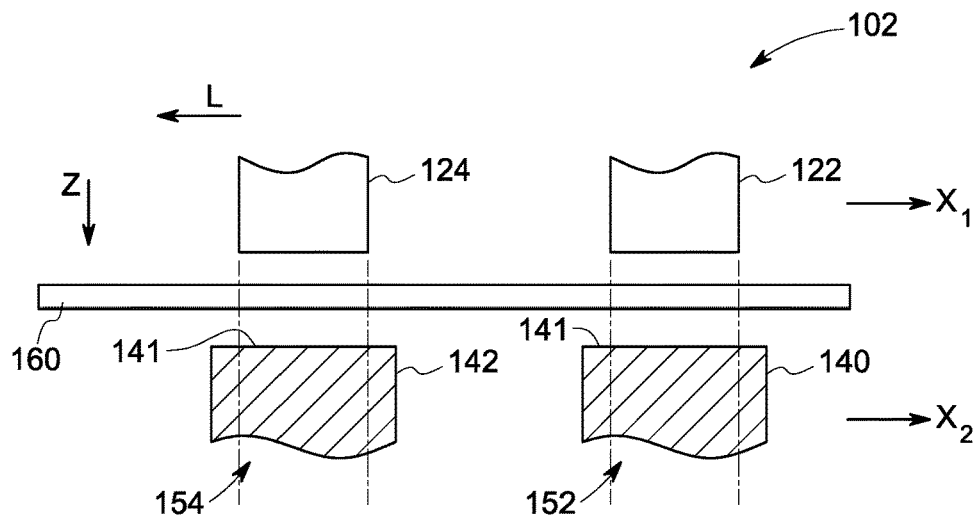
FIG. 3 is a schematic view of a portion an automatic layup system for laying up a plurality of composite plies in accordance with one embodiment of the present disclosure.
Figure 4:
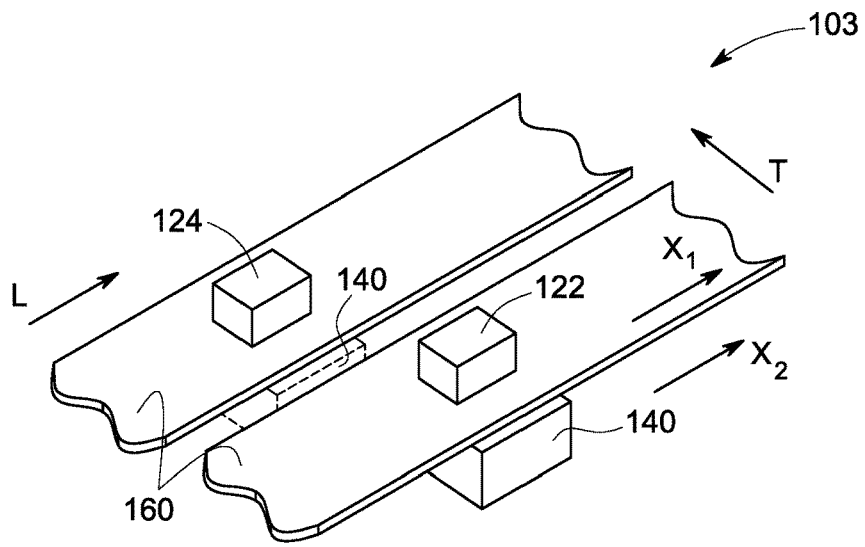
FIG. 4 is a schematic top view a portion of an automatic layup system for laying up a plurality of composite plies in accordance with one embodiment of the present disclosure.

In some embodiments as illustrated in FIGS. 2-4, the automatic layup systems 101, 102, and 103 include two stacking assemblies 122 and 124. The stacking assemblies 122 and 124 may be configured to separate composite plies of same or different shapes, sizes, or shapes and sizes, and/or apply different compressive forces on composite plies. Reference numerals that are common to the automatic layup systems 100, 101, 102, and 103 of FIGS. 1-4, represent similar or identical elements. The stacking assemblies 122 and 124 are located in a first plane '$X_1$' when the automatic layup systems 101, 102, and 103 are in resting state. The stacking assemblies 122 and 124 may be movable in the direction 'z' in an operating state of the automatic layup systems 101, 102, and 103. As illustrated in FIGS. 2-3, the stacking assemblies 122 and 124 are arranged in one row along a longitudinal direction 'L' in the automatic layup systems 101 and 102. In some other embodiments, the stacking assemblies 122 and 124 may be arranged in any desired manner in the first plane '$X_1$', for example, in parallel rows along the longitudinal direction 'L' as shown in FIG. 4. FIG. 4 shows a top view of the automatic layup system 103 having the two stacking assemblies 122 and 124 arranged in two different rows in the first plane '$X_1$.'

Further, the automatic layup systems 101, 102 or 103 may include a single or multiple layup tools 140 and 142. In some embodiments, as illustrated in FIG. 2, the automatic layup system 101 includes a single layup tool 140. The layup tool 140 has a molding surface 141. The layup tool 140 is movable in the second plane '$X_2$' to the positions 152 and 154 aligned with the corresponding stacking assemblies 122 and 124. In some embodiments, the automatic layup system 102 or 103 as shown in FIG. 3 or 4, includes two layup tools 140 and 142. Moreover, the automatic layup systems 101, 102 or 103 may include any number of stacking assemblies and any number of layup tools as per manufacturing suitability and requirement.

Each stacking assembly 120, 122, 124 as shown in one or more of FIGS. 1-4, includes at least a positioning tool (not shown in Figures) that is configured to place a composite ply on the layup tool(s) 140 and/or 142 or a previously placed composite ply on the layup tool(s) 140 and/or 142. In some embodiments, the positioning tool is configured to separate a composite ply from one or more composite sheets prior to or during placing the composite ply on the layup tool(s) 140/142 or a previously placed composite ply on the layup tool(s). In some embodiments, the positioning tool is a stamping tool. In some embodiments, each stacking assembly 120, 122, 124 further includes a separating tool that is configured to separate a composite ply from one or more composite sheets. In one embodiment, the separating tool is a cutting tool. In embodiments as illustrated in FIGS. 2-4, the stacking assemblies 122 and 124 may be configured to separate composite plies of same or different shapes, sizes, or shapes and sizes, as desired. Further, in some embodiments, each stacking assembly 120, 122, 124 includes a forming tool that is configured to apply a compressive force to a composite ply. In embodiments as illustrated in FIGS. 2-4, the stacking assemblies 122 and 124 may include forming tools configured to apply different compressive force on composite plies. In some embodiments, each stacking assembly 120, 122, 124 includes a separating tool, a positioning tool and a forming tool. In some further embodiments, each stacking assembly 120, 122, 124 may include a heating element (not shown in Figures) for heating a composite ply. In some embodiments, each stacking assembly 120, 122, 124 may include an integrated positioning tool that further includes one or more of the separating tool, the forming tool or the heating tool integrated with the positioning tool.

Figure 5:
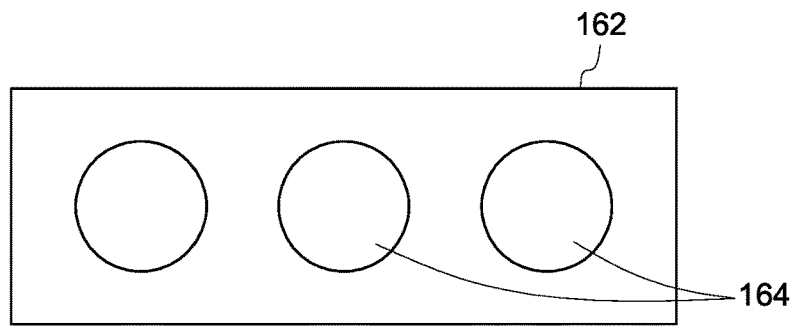
FIG. 5 is a schematic top view of a support structure, in accordance with one embodiment of the disclosure.

Referring to FIGS. 1-4, the automatic layup systems 100, 101, 102, and 103 includes a support structure 160 configured to hold one or more composite sheets between the corresponding stacking assembly 120 or the stacking assemblies 122, 124 and the single or two layup tools 140. In some embodiments, the support structure 160 includes a planar surface 162 having one or more openings 164 as shown in FIG. 5. In way of an example, referring to FIG. 1, the stacking assembly 120 may move towards the layup tool 140 through the one or more openings 164 of the planar surface 162 (FIG. 5) to place a composite ply on the layup tool 140.

The movement of various elements of the automatic layup system such as stacking assemblies, layup tool(s) and the support structure may be activated by a mechanical system or a controller such as a computing unit. For example, the movement of the stacking assembly/assemblies and the layup tool(s) can be activated by designed machines or robotic systems. The supply of the one or more composite sheets to the automatic layup system may also be activated or controlled by a mechanical system or controller.

In some embodiments, a method for making a stack of a plurality of composite plies is described. In some embodiments, the method for making the stack of the plurality of composite plies is performed using an automatic layup system. The automatic layup system includes a layup tool and a stacking assembly. The stacking assembly is located in a first plane of the automatic layup system and the layup tool is located in a second plane parallel to the first plane. The stacking assembly and the layup tool are movable towards each other. The method includes the step (a) of providing one or more composite sheets between the layup tool and the stacking assembly of the automatic layup system. In some embodiments, providing the one or more composite sheets includes supplying the one or more composite sheets using a support structure. After providing the one or more composite sheets, the method includes the step (b) of generating a first composite ply from the one or more composite sheets by the stacking assembly. In some embodiments, the generating step (b) includes separating the first composite ply from the one or more composite sheets by the stacking assembly. The method further includes the step (c) of placing the first composite ply on the layup tool by the stacking assembly by bringing the stacking assembly and the layup tool close to each other. In some embodiments, the step of generating the first composite ply may be performed prior to or during placing the first composite ply on the layup tool.

The method further includes the step (d) of repeating the steps (b) and (c) for generating a second composite ply from the one or more composite sheets and placing the second composite ply on the first composite ply placed on the layup tool. The placing of the first composite ply and the second composite ply may be performed by the stacking assembly using at least a positioning tool. The steps of generating the first composite ply and the second composite ply may be performed by the stacking assembly using, for example, a separating tool.

In some embodiments, the method includes compressing (for example, compacting or pushing) the first or the second composite ply while generating and placing the corresponding composite ply on the layup tool or the previously placed composite ply. In some embodiments, the method includes stamping the first composite ply or the second composite ply on the layup tool or the previously placed composite ply on the layup tool. This compressing of a composite ply while generating and placing the corresponding composite ply can be performed by a tool, for example, a stamping tool integrated with the positioning tool or the positioning tool having a shape suitable for the desired purpose.

In some embodiments, the method includes repeating the steps (b) and (c) multiple times after the step (d) with a third, fourth and $n^{th}$ composite ply for generating and placing the third, fourth and $n^{th}$ composite ply on a previously placed composite ply on the layup tool to make the stack of the plurality of composite plies. In some embodiments, the method includes repeating the steps (b) and (c) for generating a third composite ply from the one or more composite sheets and placing the third composite ply on the second composite ply. Similarly, the method may further include repeating the steps (b) and (c) for generating a fourth composite ply from the one or more composite sheets and placing the fourth composite ply on the third composite ply. In some embodiments, the method includes generating the third, fourth and $n^{th}$ composite ply prior to or during the corresponding steps of placing the third, fourth and $n^{th}$ composite ply on the previously placed composite ply on the layup tool. A value of 'n' may be at least 5. Depending on various parameters, for example thickness of the composite plies and various end use applications, the value of 'n' may range from 5 to about 10000. In some embodiments, the value of 'n' is in a range from about 10 to about 1000.

In some embodiments, the method includes rotating the layup tool about the vertical axis 's' to attain a desired position in the second plane prior to place a composite ply on the layup tool or a subsequent composite ply on the previously placed composite ply. This rotation of the layup tool allows to place the subsequent composite ply in a desired orientation with respect to the previously placed composite ply on the layup tool.

In some embodiments, the method includes the steps of applying a first compressive force on the first composite ply after or during placing the first composite ply on the layup tool and prior to the step (d). In some embodiments, the step of applying the first compressive force on the first composite ply may be performed prior to placing the second composite ply on the first composite ply. This application of the first compressive force may be performed by the stacking assembly using a forming tool. In some embodiments, the placing and the applying the first compressive force on the first composite ply may be performed sequentially or simultaneously. Similarly, the method may include the steps of applying a second, third, fourth and $n^{th}$ compressive force on the corresponding second, third, fourth and $n^{th}$ composite ply after or during placing the corresponding composite ply on the previously placed composite ply and prior to placing the subsequent composite ply on the corresponding composite ply. The first, second, third, fourth and $n^{th}$ compressive force may be different depending on desired pressure to be applied on the number of composite plies placed below the corresponding first, second, third, fourth and $n^{th}$ composite ply in the stack. In some other embodiments, the method includes the step of applying a compressive force on the stack of the plurality of composite plies placed on the layup tool to form a composite structure. In these embodiments, the compressive force may be applied using for example, a membrane, bladder, roller or die forming. Application of a compressive force to the one or more composite plies or the stack of the plurality of composite plies helps to adhere the one or more composite plies or the stack of the plurality of composite plies without wrinkles to the previously placed composite ply on the layup tool or the layup tool.

In embodiments where the method of making the stack of the plurality of composite plies includes the steps of applying a first, second, third and $n^{th}$ compressive force on the corresponding first, second, third and $n^{th}$ composite ply after or during placing the corresponding composite ply on the previously placed composite ply and prior to placing the subsequent composite ply on the corresponding composite ply, the resulting stack of the plurality of composite plies forms a composite structure. In embodiments where the method includes the step of applying the compressive force on the stack of the plurality of composite plies placed on the layup tool, a composite structure is formed after applying the compressive force on the stack of the plurality of composite plies.

Figure 6A:
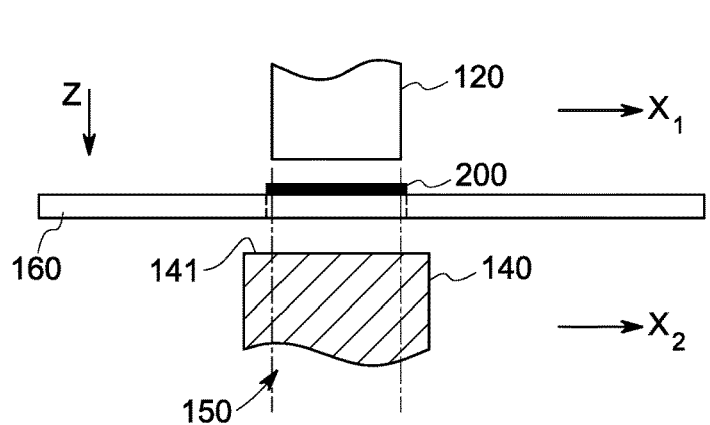
FIG. 6(a) shows a schematic representation of a step for forming a stack of composite plies using an automatic layup system in accordance with one embodiment of the present disclosure.
Figure 6B:
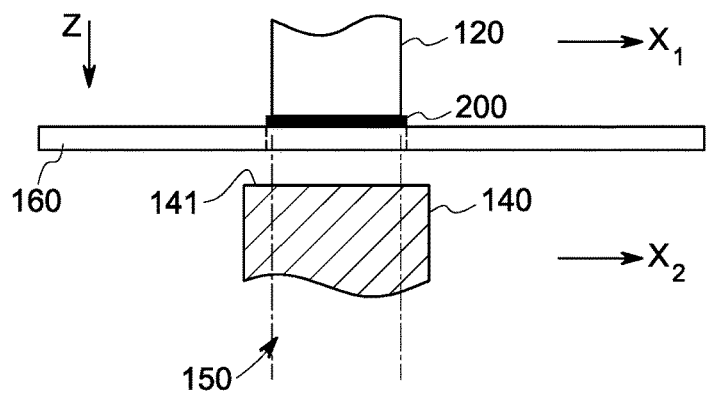
FIG. 6(b) shows a schematic representation of a step for forming a stack of composite plies using an automatic layup system in accordance with one embodiment of the present disclosure.
Figure 6C:
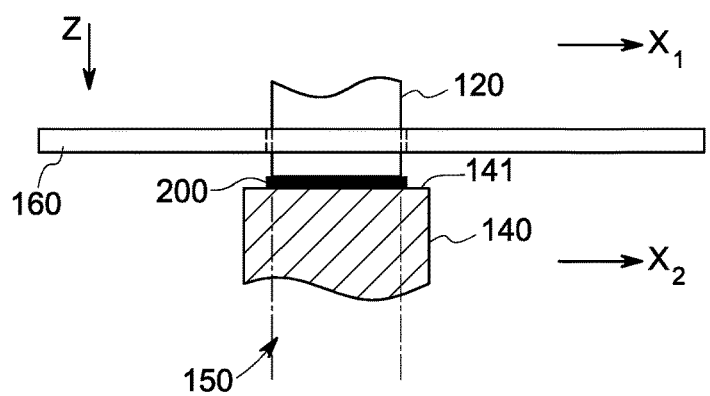
FIG. 6(c) shows a schematic representation of a step for forming a stack of composite plies using an automatic layup system in accordance with one embodiment of the present disclosure.
Figure 6D:
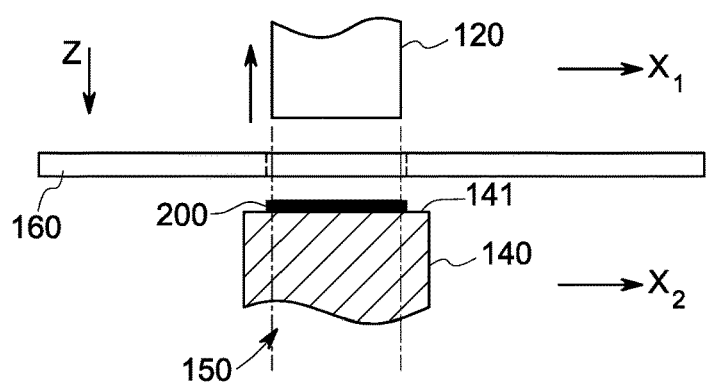
FIG. 6(d) shows a schematic representation of a step for forming a stack of composite plies using an automatic layup system in accordance with one embodiment of the present disclosure.
Figure 6E:
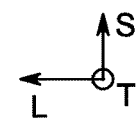
FIG. 6(e) shows a schematic representation of a step for forming a stack of composite plies using an automatic layup system in accordance with one embodiment of the present disclosure.
Figure 6E:
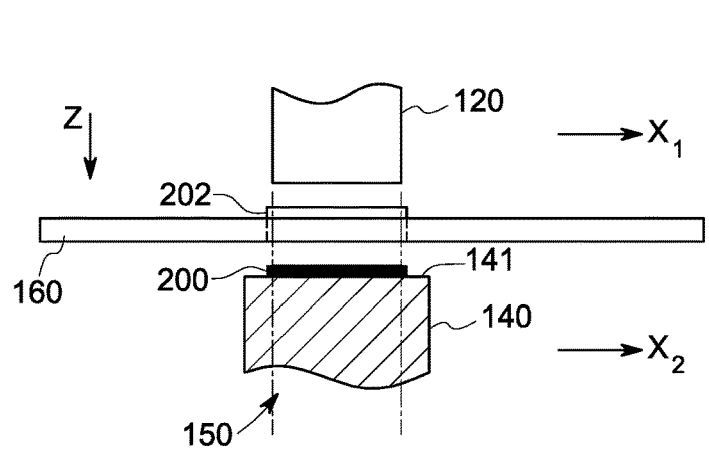
Figure 6F:
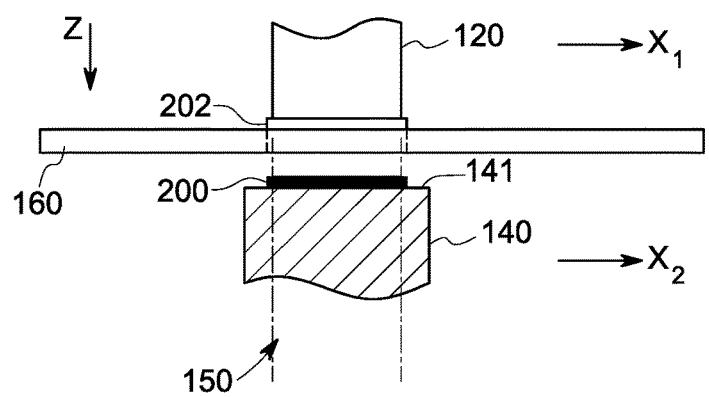
FIG. 6(f) shows a schematic representation of a step for forming a stack of composite plies using an automatic layup system in accordance with one embodiment of the present disclosure.
Figure 6G:
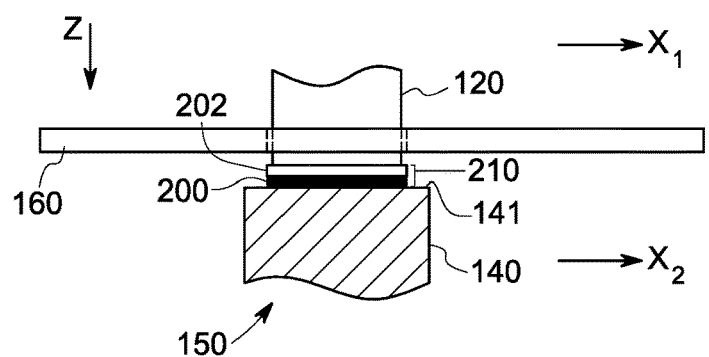
FIG. 6(g) shows a schematic representation of a step for forming a stack of composite plies using an automatic layup system in accordance with one embodiment of the present disclosure.
Figure 6H:
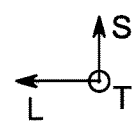
FIG. 6(h) shows a schematic representation of a step for forming a stack of composite plies using an automatic layup system in accordance with one embodiment of the present disclosure.
Figure 6H:
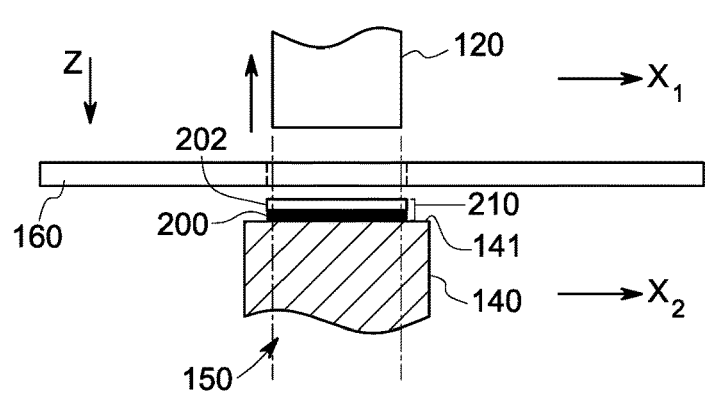

FIGS. 6(a)-6(g) schematically represent one embodiment of the method for making a stack of a plurality of composite plies using the automatic layup system 100 as shown in FIG. 1. FIG. 6(a) illustrates the step of providing a first composite ply 200 generated from one or more composite sheets provided between the layup tool 140 and the stacking assembly 120 of the automatic layup system 100. The one or more composite sheets may be supplied using the support structure 160 between the layup tool 140 and the stacking assembly 120. Next, as illustrated in FIGS. 6(b)-6(c), the method includes placing the first composite ply 200 on the layup tool 140 by the stacking assembly 120. The placing is performed by moving the stacking assembly 120 to the layup tool 140 or in some cases, by moving the layup tool 140 towards the stacking assembly. For example, as shown in FIGS. 6(b)-6(c), in some embodiments, the method includes moving the stacking assembly 120 to the layup tool 140 through the support structure 160 (for example, through an opening 164 of the planar surface 162 as shown in FIG. 5), and placing the first composite ply 200 on the molding surface 141 of the layup tool 140. After placing the first composite ply 200 on the layup tool 140, the method includes moving the stacking assembly 120 in an opposite direction of the direction 'z' to attain its previous position as shown in FIG. 6(d). The method further includes repeating the steps 6(a) and 6(b) with a second composite ply 202 for placing the second composite ply 202 on the first composite ply 200 placed on the layup tool 140 as shown in FIGS. 6(e)-6(g). Thus, the method includes providing the second composite ply 202 between the stacking assembly 120 and the layup tool 140 as shown in FIG. 6(e) similar to the method step as shown in FIG. 6(a) for providing the first composite ply 200. The second composite play 202 is generated from the one or more composite sheets provided between the stacking assembly 120 and the layup tool 140. In next step, the method includes placing the second composite ply 202 by the stacking assembly 120 on the first composite ply 200 placed on the layup tool 140. As shown in FIGS. 6(f)-6(g), the method includes moving the stacking assembly 120 to the layup tool 140 similar to the step as shown in FIGS. 6(b)-6(c) and placing the second composite ply 202 on the previously placed first composite ply 200 on the layup tool 140 to form a stack 210 of the first and second composite plies 200 and 202. After placing the second composite ply 202 on the first composite ply 200, the method 10 includes moving the stacking assembly 120 in an opposite direction of the direction 'z' to attain its previous position as shown in FIG. 6(h). In these embodiments, the first composite ply 200 and the second composite ply 202 may be same or different in material, orientation, or both.

In some embodiments, the method includes repeating the steps as shown in FIGS. 6(e)-6(h) with a third, fourth and $n^{th}$ composite ply for placing the third, fourth and $n^{th}$ composite ply on the previously placed composite ply on the layup tool 140 to make a stack of a plurality of composite plies. In these embodiments, the plurality of composite plies may be same or different in material, orientation, or both.

In some embodiments, the step of providing the first composite ply 200 may include generating the first composite ply 200 from one or more composite sheets prior to or during the steps 6(a)-6(c) of placing the first composite ply 200. In these instances, the method includes separating the first composite ply 200 from the one or more composite sheets by the stacking assembly 120, for example using a stamping tool or a separating tool (as described previously) of the stacking assembly 120. In some embodiments, the method includes separating the first composite ply 200 from the one or more composite sheets while moving the stacking assembly 120 to the layup tool 140 through the support structure 160 (for example, through an opening 164 of the substantially planar surface 162), and placing the first composite ply 200 on the layup tool 140. In a similar way, the step of providing the second composite ply 202 may include generating the second composite ply 202 from one or more composite sheets prior to or during the steps 6(e)-6(g) of placing the second composite ply 202. The method 10 may include separating the second composite ply 202 from the one or more composite sheets by the stacking assembly 120 while moving the stacking assembly 120 to the layup tool 140 through the support structure 160 (for example, through an opening 164 of the substantially planar surface 162), and placing the second composite ply 202 on the first composite ply 200 placed on the layup tool 140.

Similarly, the method may further include generating a subsequent composite ply from the one or more composite sheets prior to or during the step of placing the subsequent composite ply on the previously placed composite ply. In some embodiments, the method includes separating the third, fourth and $n^{th}$ composite ply from the one or more composite sheets prior to or during the corresponding steps of placing the third, fourth and $n^{th}$ composite ply on the previously placed composite ply.

In some other embodiments, an alternative method for making a stack of a plurality of composite plies is described. In these embodiments, the method for making the stack of the plurality of composite plies is performed using an automatic layup system that includes a layup tool and a plurality of stacking assemblies. The plurality of stacking assemblies are located in a first plane and the layup tool is movable in a second plane parallel to the first plane to a plurality of positions aligned with the plurality of stacking assemblies. Each stacking assembly of the plurality of stacking assemblies and the layup tool are movable towards each other in an operating state of the automatic layup system. In some embodiments, each stacking assembly of the plurality of stacking assemblies includes a separating tool and a positioning tool. In some embodiments, each stacking assembly further includes a forming tool as described herein. The plurality of stacking assemblies may be configured to separate the composite plies of same or different shapes, sizes, or shapes or sizes from one or more composite sheets. In these embodiments, each composite ply of the stack of the plurality of composite plies may be different in material, shape, size, orientation or combinations thereof.

The method includes the step (i) of providing one or more composite sheets between the layup tool and the plurality of stacking assemblies. In some embodiments, providing the one or more composite sheets includes supplying the one or more composite sheets using a support structure. The one or more composite sheets may be same or different in their materials, structures (e.g., fiber orientation) or both. In some embodiments, one composite sheet is supplied between the layup tool and each stacking assembly of the plurality of stacking assemblies. After providing the one or more composite sheets, the method includes the step (ii) of separating a first composite ply from the one or more composite sheets and placing the first composite ply on the layup tool by a first stacking assembly of the plurality of stacking assemblies. This separating and placing the first composite ply are performed by bringing the first stacking assembly and the layup tool close to each other when the layup tool is at a first position of the plurality of positions aligned with the first stacking assembly. The step of separating the first composite ply may be performed prior to or during the step of placing the first composite ply on the layup tool. The method further includes the step (iii) of moving the layup tool with the first composite ply to a second position of the plurality of the positions aligned with a second stacking assembly of the plurality of stacking assemblies. Then, the method includes the step (iv) of separating a second composite ply from the one or more composite sheets and placing the second composite ply on the first composite ply placed on the layup tool by the second stacking assembly. The separating and placing the second composite ply are performed by bringing the second stacking assembly and the layup tool close to each other with the first composite ply placed on the layup tool. The step of separating the second composite ply may be performed prior to or during the step of placing the second composite ply on the first composite ply placed on the layup tool.

In some embodiments, the method further includes repeating steps (iii) and (iv) multiple times to place a third, fourth and $n^{th}$ composite ply on a previously placed composite ply on the layup tool when the layup tool is at a third, fourth and $n^{th}$ positon of the plurality of positions aligned with the third, fourth and $n^{th}$ stacking assembly of the plurality of stacking assemblies to make the stack of the plurality of composite plies. A value of 'n' may be at least 5. Depending on various parameters, for example thickness of the composite plies and various end use applications, the value of 'n' may range from 5 to about 10000. In some embodiments, the value of 'n' is in a range from about 10 to about 1000

In some embodiments, the method includes rotating the layup tool about the vertical axis to attain a desired position (for example, a desired orientation) after moving the layup tool to a position aligned with a stacking assembly of the plurality of stacking assemblies and prior to placing a composite ply on the layup tool or placing a subsequent composite ply on the previously placed composite ply on the layup tool. This rotation of the layup tool allows to place the subsequent composite ply in a desired orientation with respect to the previously placed composite ply on the layup tool.

In some embodiments, the method further includes applying a first compressive force on the first composite ply after the step (ii) and prior to the step (iv) and applying a second compressive force on the second composite ply after the step (iv). In some embodiments, the application of the first compressive force on the first composite ply may be performed after or during placing the first composite ply. In some embodiments, the application of the first compressive force on the first composite ply may be performed prior to placing the second composite ply on the first composite ply. In some embodiments, the application of the second compressive force on the second composite ply may be performed after or during placing the second composite ply on the first composite ply. In some embodiments, the application of the second compressive force on the second composite ply is performed prior to placing a third composite ply on the second composite ply. Similarly, the method includes applying a third, fourth and $n^{th}$ compressive force on the corresponding third, fourth and $n^{th}$ composite ply independently after or during placing the corresponding third, fourth and $n^{th}$ composite ply on the previously placed composite ply on the layup tool. In some embodiments, the application of the third, fourth and $n^{th}$ compressive force on the corresponding third, fourth and $n^{th}$ composite ply is performed prior to placing the subsequent composite ply on the previously place composite ply on the layup tool.

Figure 7A:
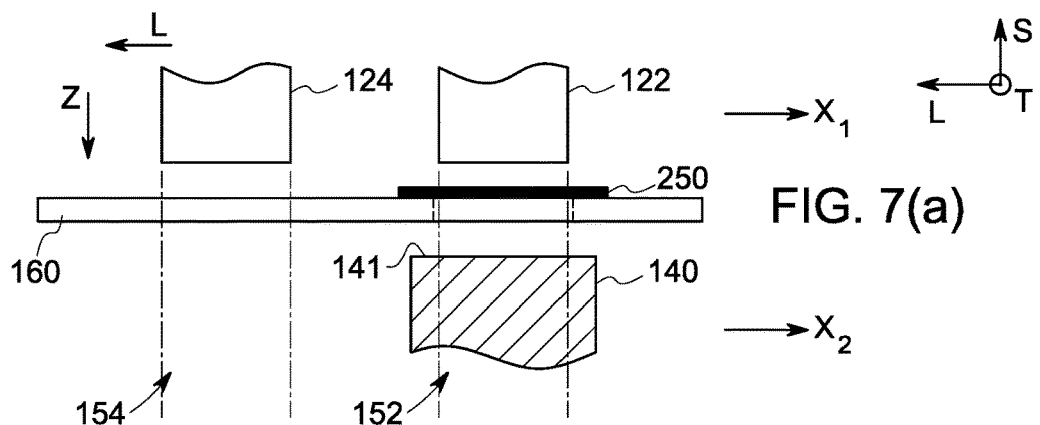
FIG. 7(a) shows a schematic representation of a step for forming a stack of composite plies using an automatic layup system in accordance with one embodiment of the present disclosure.

FIGS. 7(a)-7(h) schematically represent one embodiment of a method for making a stack of a plurality of composite plies using the automatic layup system 101 as shown in FIG. 2. In FIG. 7 (a), a layup tool 140 is located at a first position 152 in a second plane '$X_2$' aligned with a first stacking assembly 122. As illustrated in FIG. 7(a), the method includes providing a composite sheet 250 between the stacking assemblies 122, 124 and the layup tool 140. As illustrated, the method includes supplying the composite sheet 250 using the support structure 160. In some embodiments, the method includes supplying the composite sheet 250 between the stacking assembly 122, 124 and the layup tool 140 along the longitudinal direction 'L.' In some other embodiments, the method includes supplying the composite sheet 250 between the stacking assembly 122 and the layup tool 140 in the transverse direction 'T.'

Figure 7B:
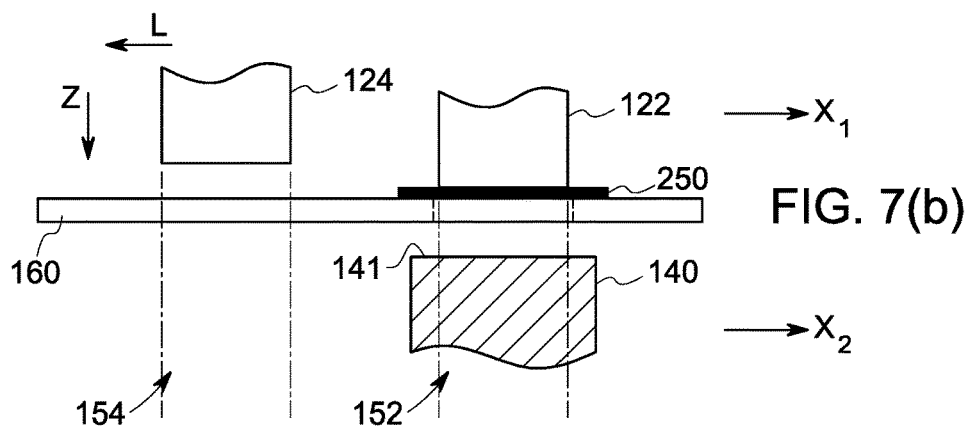
FIG. 7(b) shows a schematic representation of a step for forming a stack of composite plies using an automatic layup system in accordance with one embodiment of the present disclosure.
Figure 7C:
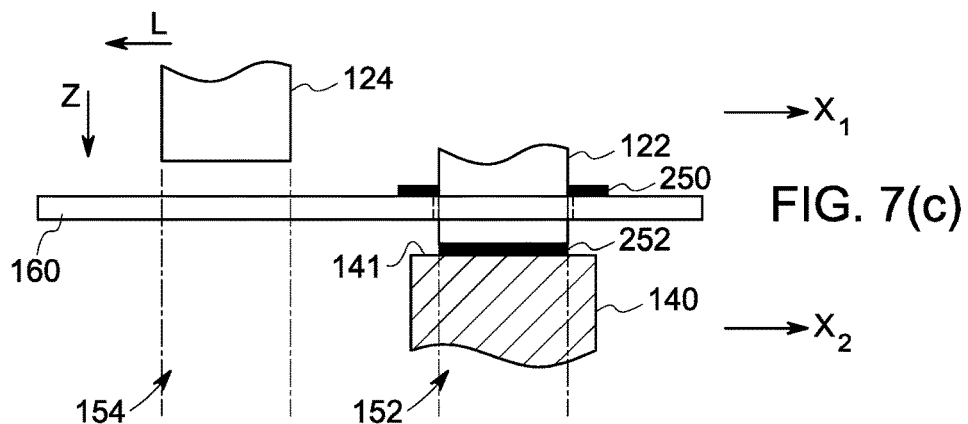
FIG. 7(c) shows a schematic representation of a step for forming a stack of composite plies using an automatic layup system in accordance with one embodiment of the present disclosure.
Figure 7D:
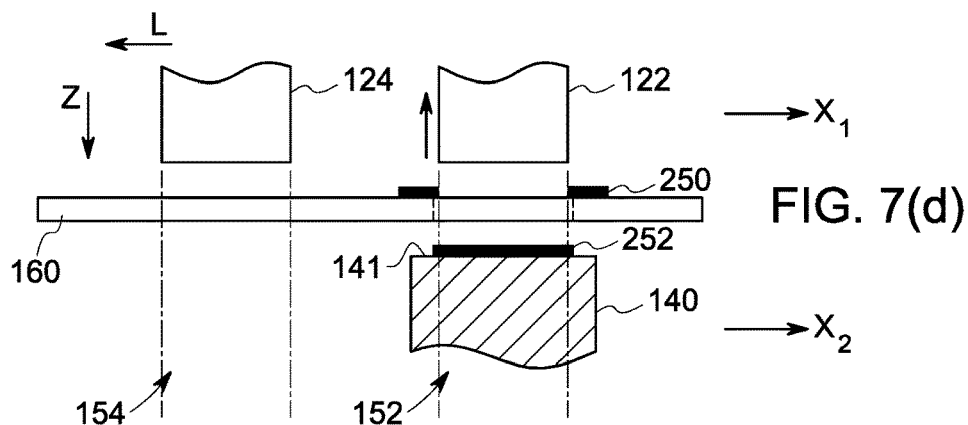
FIG. 7(d) shows a schematic representation of a step for forming a stack of composite plies using an automatic layup system in accordance with one embodiment of the present disclosure.
Figure 7E:
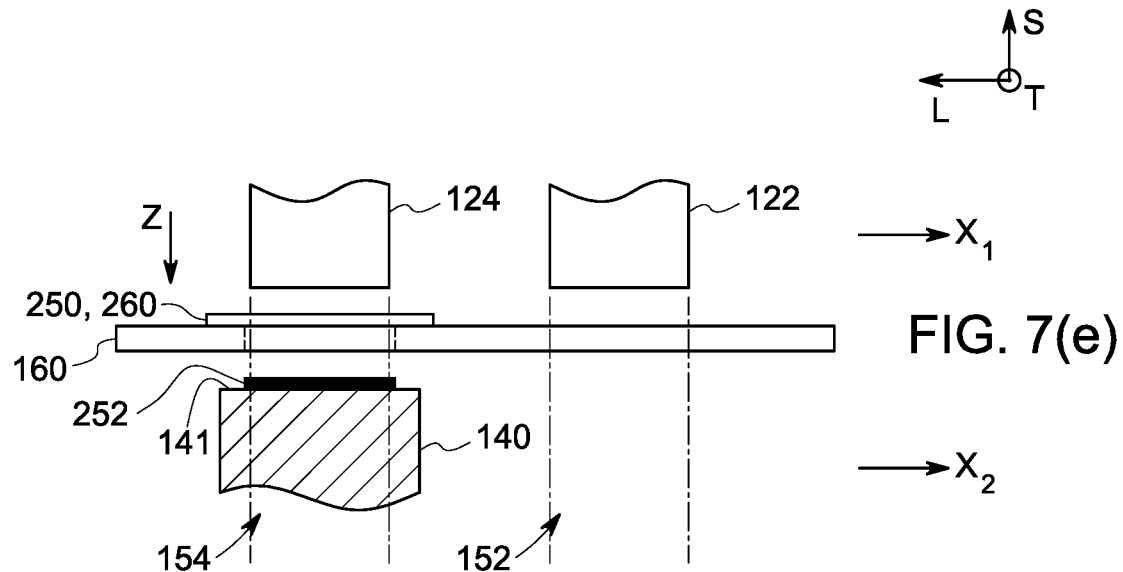
FIG. 7(e) shows a schematic representation of a step for forming a stack of composite plies using an automatic layup system in accordance with one embodiment of the present disclosure.
Figure 7F:
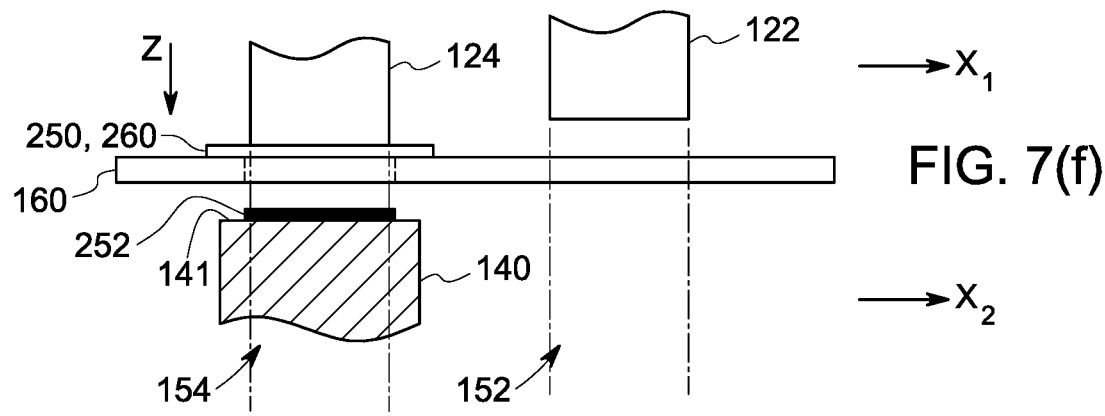
FIG. 7(f) shows a schematic representation of a step for forming a stack of composite plies using an automatic layup system in accordance with one embodiment of the present disclosure.

In next step, the method includes separating a first composite ply 252 from the composite sheet 250 and placing the first composite ply 252 on the molding surface 141 of the layup tool 140. The separating and placing the first composite ply 252 is performed by the first stacking assembly 122 as shown in FIGS. 7(b)-7(c) by moving the first stacking assembly 122 to the layup tool 140. After placing the first composite ply 252 on the layup tool 140, the method includes moving the first stacking assembly 122 in the reverse direction of the direction 'z' to its previous position as shown in FIG. 7(d).

In the next step, the method includes moving the layup tool 140 to a second position 154 in the second plane '$X_2$' aligned with the second stacking assembly 124 as shown in FIG. 7 (e). At this stage, the method includes providing the composite sheet 250 or another composite sheet 260 between the stacking assembly 124 and the layup tool 140 as shown in FIG. 7 (e). In embodiments where the composite sheet 250 is supplied in the longitudinal direction 'L', the method may include continue supplying the composite sheet 250 between the stacking assembly 124 and the layup tool 140. In embodiments where the composite sheet 250 is supplied in the transverse direction, the method may include supplying another composite sheet 260 between the stacking assembly 124 and the layup tool 140. The method includes separating a second composite ply 254 or 262 from the corresponding composite sheet 250 or 260 and placing the second composite ply 254 or 262 on the first composite ply 252 placed on the layup tool 140. The separating and placing the second composite ply 254 or 262 may be performed by the second stacking assembly 124 as shown in FIGS. 7(f)-7(g) by moving the second stacking assembly 124 to the layup tool 140. After placing the second composite ply 254 or 262 on the first composite ply 252 placed on the layup tool 140, the method includes moving the second stacking assembly 124 in the reverse direction of the direction 'z' to its previous position. The placing the second composite ply 254 or 262 on the first composite ply 252 forms a stack 300 of the first composite ply 252 and the second composite ply 254 or 262 on the layup tool 140.

Figure 7G:
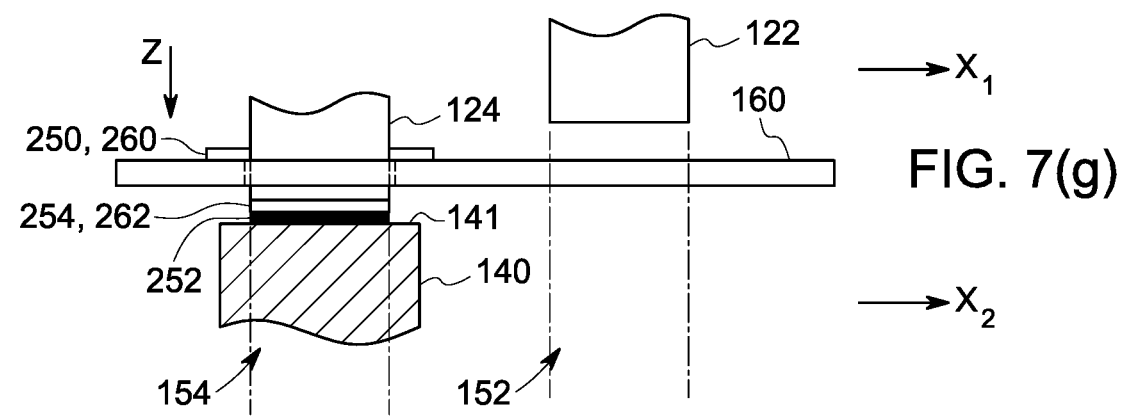
FIG. 7(g) shows a schematic representation of a step for forming a stack of composite plies using an automatic layup system in accordance with one embodiment of the present disclosure.
Figure 7H:
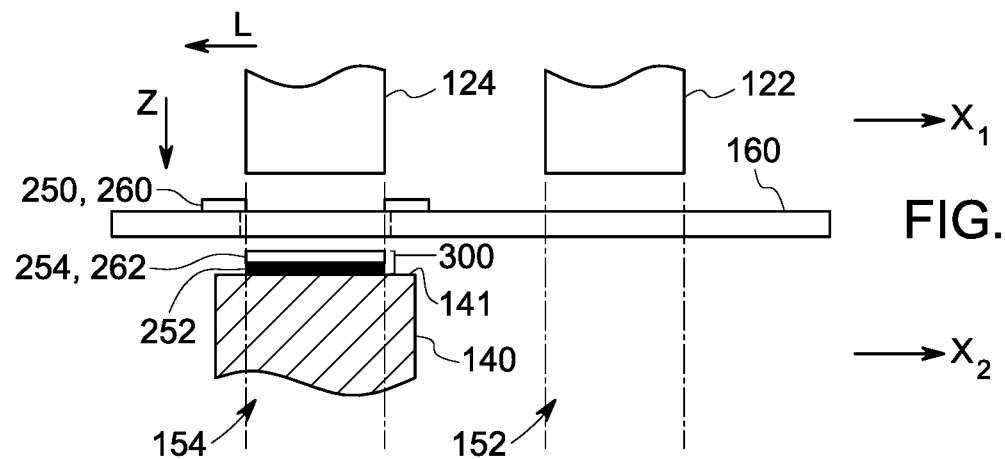
FIG. 7(h) shows a schematic representation of a step for forming a stack of composite plies using an automatic layup system in accordance with one embodiment of the present disclosure.

In some embodiments, the method includes applying a first compressive force on the first composite ply 252 by the first stacking assemblies 122 for example, by the forming tool of the stacking assemblies 122 after or during placing the first composite plies 252 on the layup tool 140 as shown in FIG. 7(c). Similarly, the method further includes applying a second compressive force on the second composite ply 254 or 262 by the second stacking assembly 124 after or during placing the second composite ply 254 or 262 on the first composite ply 250 placed on the layup tool 140 as shown in FIG. 7(g). In these embodiments, the resulting stack 300 formed may be a composite structure. In some other embodiments, the method includes applying a compressive force on the stack of the first composite ply 252 and the second composite ply 254 or 262 to form a composite structure.

Figure 7I:
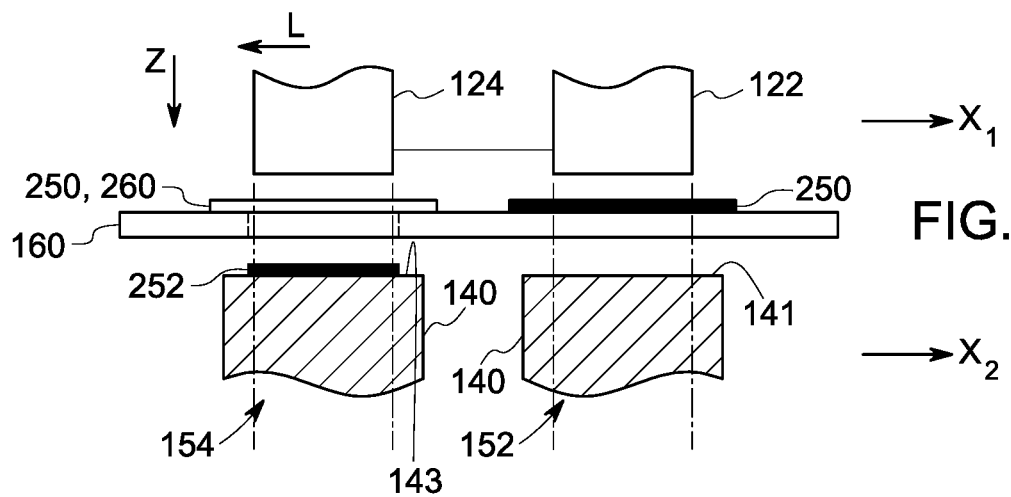
FIG. 7(i) shows a schematic representation of a step for forming a stack of composite plies using an automatic layup system in accordance with one embodiment of the present disclosure.

In embodiments where an automatic layup system, for example the automatic layup system 102 includes two layup tools 140 as shown in FIG. 3, the method includes moving another layup tool 140 at the first position 152 aligned with the first stacking assembly 122 as shown in FIG. 7(i), after moving the layup tool 140 to the second position in the second plane '$X_2$'. In these embodiments, the method includes repeating the steps as shown in FIGS. 7(a)-7(d) for placing another set of the first composite ply 252 on another layup tool 144 and the second composite ply 254 or 262 for forming another stack of the first composite ply 252 and the second composite ply 254 or 262 while continuing the desired steps for forming the stack 300 on the layup tool 140 and moving the layup tool 140 to a subsequent position in the second plane '$X_2$.'

Although the methods and features of methods are described in view of FIGS. 1, 2 and 3 for simplicity, the methods and features of the methods described herein are applicable to the automatic layup system 103 of FIG. 4. Further, the methods include providing any number of layup tools to the automatic layup systems 100, 101, 102, and 103 as shown in FIGS. 1-4 to form several stacks for manufacturing desired number of composite structures. In this way, the method provides a cost-effective method for forming composite structures for production purposes.

From the present description, it will be appreciated that the present methods and systems may allow to automatically place the composite plies while avoiding picking the composite plies from one location (from example, from a cutting apparatus) and placing at another location (for example, a stamping or forming apparatus) to form a stack of composite plies. In addition, the methods and systems of the present disclosure may include automatically performing separating, placing and forming steps in a single apparatus for placing the composite plies on a layup tool to form a stack of a plurality of composite plies. Further, the method as described herein, in some embodiments, allows forming a stack of a plurality of composite plies including composite plies that are different in material, fiber orientation, shape, size or combinations thereof as desired to form a composite structure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for making a stack of a plurality of composite plies, comprising:
   (a) providing one or more composite sheets between a layup tool and a stacking assembly of an automatic layup system, wherein the stacking assembly is located in a first plane of the automatic layup system and the layup tool is located in a second plane parallel to the first plane, and wherein the stacking assembly and the layup tool are movable towards each other, wherein providing the one or more composite sheets comprises supplying the one or more composite sheets using a support structure which includes a planar surface having one or more openings;
   (b) generating a first composite ply from the one or more composite sheets;
   (c) placing the first composite ply on the layup tool by the stacking assembly by bringing the stacking assembly and the layup tool close to each other; and
   (d) repeating the steps (b) and (c) for generating a second composite ply and placing the second composite ply on the first composite ply placed on the layup tool.

2. The method of claim 1, further comprising repeating the step (d) multiple times for generating a third, fourth and nth composite ply from the one or more composite sheets and placing the third, fourth and nth composite ply on a previously placed composite ply on the layup tool.

3. The method of claim 1, wherein the generating step comprises separating the first composite ply from the one or more composite sheets by the stacking assembly.

4. The method of claim 1, further comprising applying a first compressive force on the first composite ply after or during the placing of the first composite ply on the layup tool and prior to the step (d); and applying a second compressive force on the second composite ply after or during the placing of the second composite ply on the first composite ply.

5. The method of claim 1, further comprising applying a compressive force on the stack of the plurality of composite plies to form a composite structure.

6. A method for making a stack of a plurality of composite plies, comprising:
   (i) providing one or more composite sheets between a layup tool and a plurality of stacking assemblies of an automatic layup system, wherein the plurality of stacking assemblies are located in a first plane of the automatic layup system and the layup tool is movable in a second plane parallel to the first plane to a plurality of positions aligned with the plurality of stacking assemblies, and wherein the plurality of stacking assemblies and the layup tool are movable towards each other, wherein providing the one or more composite sheets comprises supplying the one or more composite sheets using a support structure which includes a planar surface having one or more opening;
   (ii) separating a first composite ply from the one or more composite sheets and placing the first composite ply on the layup tool by a first stacking assembly of the plurality of stacking assemblies by bringing the first stacking assembly and the layup tool close to each other when the layup tool is at a first position of the plurality of positions aligned with the first stacking assembly;
   (iii) moving the layup tool with the first composite ply to a second position of the plurality of the positions aligned with a second stacking assembly of the plurality of stacking assemblies; and
   (iv) separating a second composite ply from the one or more composite sheets and placing the second composite ply on the first composite ply placed on the layup tool by the second stacking assembly by bringing the second stacking assembly and the layup tool with the first composite ply close to each other.

7. The method of claim 6, further comprising applying a first compressive force on the first composite ply after or during the placing of the first composite ply on the layup tool and prior to the step (iv) and applying a second compressive force on the second composite ply after or during the placing of the second composite ply on the first composite ply.

8. The method of claim 6, further comprising repeating steps (iii) and (iv) multiple times to separate a third, fourth and nth composite ply from the one or more composite sheets by a third, fourth and nth stacking assembly of the plurality of stacking assemblies and to place the third, fourth and nth composite ply on a previously placed composite ply on the layup tool when the layup tool is at a third, fourth and nth positon of the plurality of positions aligned with the third, fourth and nth stacking assembly of the plurality of stacking assemblies.

9. The method of claim 8, further comprising applying a third, fourth and nth compressive force on the corresponding third, fourth and nth composite ply after or during placing the corresponding third, fourth and nth composite ply onto the previously placed composite ply and prior to placing a subsequent composite ply.

10. The method of claim 8, further comprising applying a compressive force on the stack of the plurality of composite plies to form a composite structure.

11. The method of claim 6, wherein at least one composite ply of the stack of the plurality of composite plies is different from another in material, shape, size, orientation, or combinations thereof.

* * * * *